No. 712,760. Patented Nov. 4, 1902.
C. A. BREUN & B. COUCH.
STEAM COOKER.
(Application filed July 10, 1902.)
(No Model.)

Witnesses
Harry L. Amer.
T. W. Riley.

Inventors
Charles A. Breun
and Buel Couch.
By Rexford M. Smith
Attorney

UNITED STATES PATENT OFFICE.

CHARLES ALBERT BREUN AND BUEL COUCH, OF SIOUX CITY, IOWA.

STEAM-COOKER.

SPECIFICATION forming part of Letters Patent No. 712,760, dated November 4, 1902.

Application filed July 10, 1902. Serial No. 115,061. (No model.)

*To all whom it may concern:*

Be it known that we, CHARLES ALBERT BREUN and BUEL COUCH, citizens of the United States, residing at Sioux City, in the county of Woodbury and State of Iowa, have invented a certain new and useful Steam-Cooker, of which the following is a specification, reference being had therein to the accompanying drawings.

This invention relates to steam-cookers, the object in view being to provide a cooking utensil especially designed for cooking and steaming all varieties of vegetables, dried and green fruits, pudding, and cereals.

A further object of the invention is to secure rapid and economical cooking or steaming of the vegetables, &c., and at the same time to retain the maximum amount of juice or essence of the article or articles being cooked.

A further object of the invention is to provide means whereby the amount of steam and the heat therefrom may be regulated at the will of the operator.

With the above and other objects in view the invention consists in the novel construction, combination, and arrangement of parts, as hereinafter fully described, illustrated, and claimed.

Figure 1:
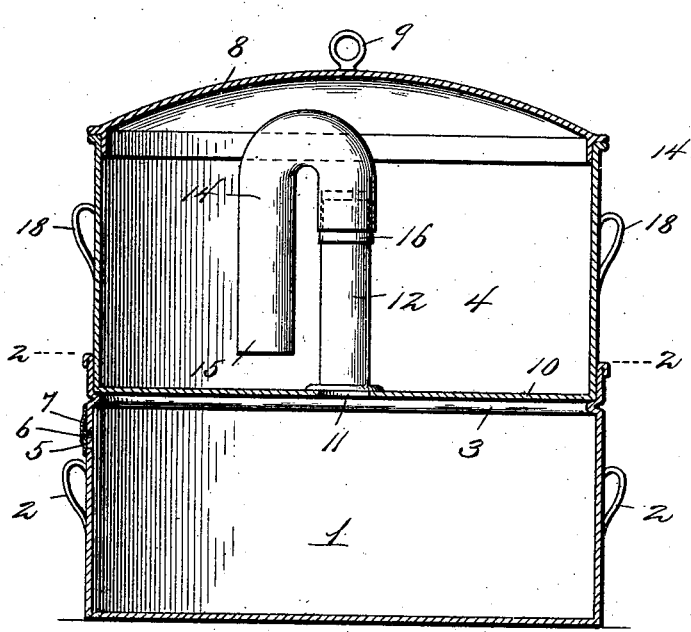
Figure 3:
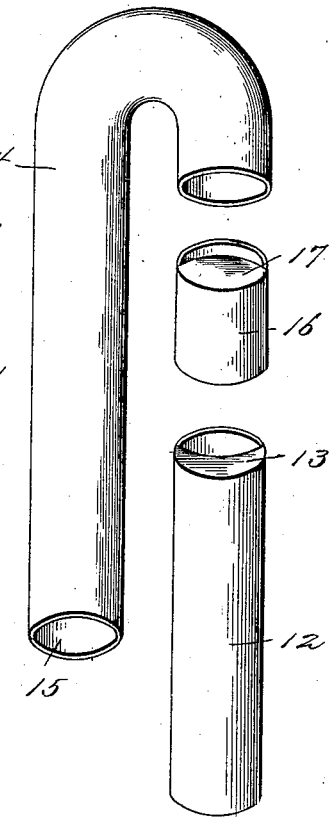
Figure 2:
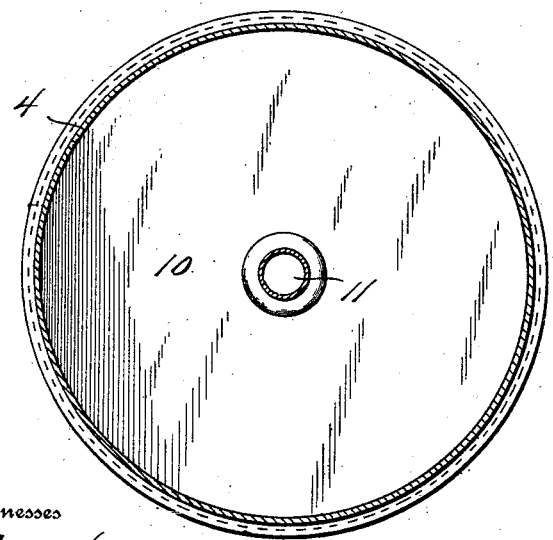
Figure 4:
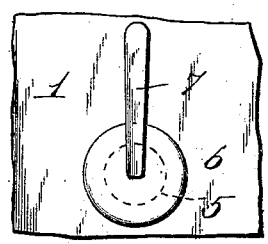

In the accompanying drawings, Figure 1 is a central vertical section through a complete steam cooking utensil constructed in accordance with the present invention. Fig. 2 is a horizontal cross-section taken on the line 2 2 of Fig. 1. Fig. 3 is a detail perspective view of the steam-pipe, elbow, and thimble, showing said parts separated. Fig. 4 is a detail elevation showing the relief-valve.

Like reference-numerals designate corresponding parts in all the figures of the drawings.

Referring to the drawings, 1 designates a boiler, which forms the base of the utensil and which is preferably cylindrical in shape, although any desired shape or configuration may be given thereto. The boiler 1 is provided with suitable handles 2 and near its upper edge is creased inward to form an annular bead or rib 3, which constitutes an elbow or rest for a superimposed vessel or receptacle 4, the bottom edge of which is adapted to rest on the bead or rib 3, as shown in Fig. 1. The boiler 1 is also provided at one side with a vent-hole 5, which is covered exteriorly by a disk-shaped relief-valve 6, held against the outer surface of the boiler by means of a spring 7 of any desired strength, said spring being secured at one end to the boiler and having the valve 6 attached to its opposite or free end.

The vessel or receptacle 4, which contains the vegetables, fruit, or other material, is provided with a suitable flanged cover 8, having a handle 9 and adapted to fit over and within the top of the vessel, as shown. About centrally the bottom 10 of the receptacle 4 is provided with an opening or steam-port 11, above which is arranged an upstanding steam-pipe 12, the upper end of which is partially closed by means of a crescent-shaped web or cut-off segment 13. Communicating with the steam-pipe 12 is an elbow or U-shaped extension 14, one extremity or the discharge end 15 of which extends downward to a point near the bottom of the receptacle 4, as shown in Fig. 1, so as to discharge the steam at a low point and well within the material contained in the receptacle. The other and downwardly-extending portion of the elbow 14 is sufficiently large to receive a tapering thimble 16, the upper or inner end of which is partially closed by a crescent-shaped web or cut-off segment 17, similar to that 13 of the steam-pipe 12. The thimble 16, while removable from the elbow 14, ordinarily fits tightly therein and also fits loosely over the upper end of the steam-pipe 12, so that the thimble 16 may, by means of the elbow 14, be partially turned or rotated upon the steam-pipe 12, so as to bring the openings in the thimble and steam-pipe into register with each other or out of alinement, in this way regulating the amount of steam passing through the steam-pipe and elbow into the receptacle 4.

The receptacle 4 is provided with handles 18, and said handles under the preferred arrangement are arranged at diametrically opposite points to correspond with and indicate the open and closed position of the segment-shaped steam-passages formed by the webs or cut-off segments 13 and 17.

In the use of the receptacle the boiler is partially filled with water and the vessel or receptacle 4, containing the material to be steamed or cooked, is then placed upon the boiler so as to rest within the top of the boiler and upon the bead or rib 3. The elbow 14 is then partially turned upon the steam-pipe, so as to supply the desired amount of steam to the vessel 4. No further attention is then required on the part of the operator.

It is obvious that under the arrangement described there is no danger of burning the material being cooked and that every particle of the food is uniformly subjected to the steam introduced through the steam-pipe. All of the juices, flavors, and essences of the food are retained, and the food may be kept at a uniform degree of heat for any length of time.

Having thus described the invention, what is claimed as new, and desired to be secured by Letters Patent, is—

1. A steam-cooker comprising a boiler, a food-receptacle supported thereon, a steam-pipe within the receptacle communicating with an opening in the bottom thereof, an adjustable extension or elbow mounted on the steam-pipe, and segmental diaphragms forming cut-offs, connected with the steam-pipe and elbow, and adapted to be moved into and out of alinement with each other, substantially as described.

2. A steam-cooker comprising a boiler, a superimposed food-receptacle having a cover, a steam-pipe within the receptacle communicating with an opening in the bottom thereof, an adjustable extension or elbow mounted on the steam-pipe, a thimble associated with said elbow and fitting over the steam-pipe, and cut-offs connected with the steam-pipe and thimble respectively and adapted to be adjusted into and out of alinement with each other, substantially as and for the purpose specified.

In testimony whereof we affix our signatures in presence of two witnesses.

CHARLES ALBERT BREUN.
BUEL COUCH.

Witnesses:
L. H. HENRY,
E. F. WALKER.